(12) United States Patent
Lee et al.

(10) Patent No.: US 10,624,111 B2
(45) Date of Patent: Apr. 14, 2020

(54) METHODS AND APPARATUSES FOR SCHEDULING SERVICE AREA IN DRONE NETWORK ENVIRONMENT

(71) Applicant: RESEARCH & BUSINESS FOUNDATION SUNGKYUNKWAN UNIVERSITY, Suwon-si (KR)

(72) Inventors: Tae-Jin Lee, Suwon-si (KR); Yunmin Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 287 days.

(21) Appl. No.: 15/923,090

(22) Filed: Mar. 16, 2018

(65) Prior Publication Data

US 2019/0150167 A1 May 16, 2019

(30) Foreign Application Priority Data

Nov. 15, 2017 (KR) .................. 10-2017-0152234

(51) Int. Cl.
*H04W 4/00* (2018.01)
*H04W 72/12* (2009.01)
(Continued)

(52) U.S. Cl.
CPC ......... *H04W 72/1231* (2013.01); *B60L 53/67* (2019.02); *B60L 53/68* (2019.02);
(Continued)

(58) Field of Classification Search
CPC ... H04W 72/1231; H04W 16/24; B60L 53/67; B60L 53/68; B64C 39/024;
(Continued)

(56) References Cited

U.S. PATENT DOCUMENTS

| 2014/0039963 A1* | 2/2014 | Augenstein ...... G06Q 10/06314 705/7.24 |
| 2016/0328979 A1* | 11/2016 | Postrel .................. B64C 39/024 |
| 2016/0379167 A1* | 12/2016 | Raman ............. G06Q 10/08355 705/338 |
| 2017/0013476 A1 | 1/2017 | Suthar et al. |

(Continued)

FOREIGN PATENT DOCUMENTS

| JP | 6186628 B2 | 8/2017 |
| KR | 10-1772345 B1 | 8/2017 |

OTHER PUBLICATIONS

Korean Office Action dated Feb. 25, 2019 in corresponding Korean Patent Application No. 10-2017-0152234 (5 pages in Korean).

(Continued)

*Primary Examiner* — Danh C Le
(74) *Attorney, Agent, or Firm* — NSIP Law

(57) ABSTRACT

Provided is methods and apparatuses for scheduling service area in drone network environment. The method includes calculating a throughput in each section while changing a variable determining the number of sections within a maximum value of the variable and determining a variable, by which the calculated throughput becomes maximum, as an optimal value when a service area of the drone is divided into a plurality of sections, dividing the service area into a plurality of sections according to the determined optimal value and scheduling a service providing period of the divided service area, and communicating with a terminal located in the service area according to the scheduled service providing period. The present invention can enhance the networks throughput and energy-efficiency of drone networks.

20 Claims, 11 Drawing Sheets

(51) Int. Cl.
| | |
|---|---|
| *G06Q 10/06* | (2012.01) |
| *B64C 39/02* | (2006.01) |
| *B60L 53/68* | (2019.01) |
| *H04W 16/24* | (2009.01) |
| *H04B 7/185* | (2006.01) |
| *B60L 53/67* | (2019.01) |
| *B60L 53/00* | (2019.01) |

(52) U.S. Cl.
CPC ..... *B64C 39/024* (2013.01); *G06Q 10/06314* (2013.01); *H04B 7/18504* (2013.01); *H04W 16/24* (2013.01); *B60L 53/00* (2019.02); *B60L 2240/70* (2013.01); *B60L 2240/72* (2013.01); *B64C 2201/122* (2013.01)

(58) Field of Classification Search
CPC ........ B64C 2201/122; G06Q 10/06314; H04B 7/18514; B06L 53/00; B06L 22/407; B06L 22/4072
USPC ........................................ 455/431, 11.1, 12.1
See application file for complete search history.

(56) References Cited

U.S. PATENT DOCUMENTS

| | | | |
|---|---|---|---|
| 2017/0263131 A1* | 9/2017 | Blomberg | G08G 5/0013 |
| 2018/0165971 A1* | 6/2018 | Chen | G08G 5/0013 |
| 2018/0224854 A1* | 8/2018 | Mullan | G05D 1/104 |
| 2018/0357909 A1* | 12/2018 | Eyhorn | G08G 5/0034 |
| 2019/0025851 A1* | 1/2019 | Ebrahimi Afrouzi | B25J 9/1664 |
| 2019/0031346 A1* | 1/2019 | Yong | B64C 39/024 |
| 2019/0072979 A1* | 3/2019 | Sukhomlinov | G01C 21/206 |

OTHER PUBLICATIONS

Woojae Jeong et al., "Throughput Performance Maximization by Service Area Scheduling in Drone-Assisted Sensor Network System", *The Autumn Conference of the Korean Institute of Communication and Information Science*, Nov. 2016, pp. 412-413.

Kim, Yunmin et al., "Service Area Scheduling in a Drone Assisted Network," *Proceedings of the 17th International Conference on Computational Science and Its Applications*, Springer, Cham, Jul. 2017.

* cited by examiner

FIG. 4

```
1:  CALCULATE k_max BY EQ. (5)
2:  S*=0
3:
4:  for k=1 to k_max do
5:
6:      CALCULATE T_DCP,k BY EQ. (2)
7:      CALCULATE m_k BY EQ. (4)
8:      CALCULATE THROUGHPUT S_k THROUGH COLLECTED DATA AND EQ. (6)
9:
10:     if S_k > S* then
11:         k*=k
12:         S*=S_k
13:     else
14:         END SEARCH MODE
15:     else if
16:
17: end for
```

FIG. 9

| Parameter | Value |
|---|---|
| SIZE OF SERVICE AREA ($L^2$) | 100km$^2$, 225km$^2$ |
| NUMBER OF SECTIONS ($k^2$) | $1^2 \sim 15^2$ |
| SPEED OF DRONE ($v_d$) | 100km/h, 200km/h |
| DURATION OF FLIGHT ($T_f$) | 7200 seconds |
| NUMBER OF DISTRIBUTED TERMINALS (N) | 100,000 |
| DATA SIZE (D) | 800 bits |

METHODS AND APPARATUSES FOR SCHEDULING SERVICE AREA IN DRONE NETWORK ENVIRONMENT

CROSS-REFERENCE TO RELATED APPLICATIONS

This application claims priority to Korean Patent Application No. 10-2017-0152234 filed on 15 Nov. 2017 in Korea, the entire contents of which are hereby incorporated by reference in their entirety.

BACKGROUND

1. Technical Field

The present invention relates to a communication network technology using a drone, and more particularly, to methods and apparatuses for scheduling a service area in a drone network environment.

2. Description of Related Art

A communication network technology using drones is as follows. Unmanned Aerial Vehicles (UAVs) or drones are being mainly used as tactical targets in the military field. However, drones have recently been expanding their application fields to the commercial sector. In particular, since drones are able to move without a geographical limitation, drones have an advantage in that they may be quickly deployed to a target area. Technologies for providing wireless communication to a target area using such drones are being developed. Google is conducting a study of providing a 5G service to terrestrial terminals with a glider flying through sunlight generation, which is a project called Skybender. In the next-generation Internet of Things (IoT) environment, a service in which a large number of terminals are deployed in a large area to collect information and report the information to the center is expected to be provided. Accordingly, it is expected that a wireless communication service using drones in areas where base stations are difficult to install will attract attention.

Necessity of dividing a service area of a drone is as follows. In a network environment using drones, the drones provide wireless communication to a target area (hereinafter referred to as a service area). The drones may transmit signals to the terminals, and may receive a response to the transmitted signals to collect information of terminals in the service area.

Considering the mobility of the drones, since the service area to be served by the drones is relatively wide, the terminals at the edge of the service area have a limitation of degradation of the communication quality. In addition, the drones have a limitation in communicable distance due to the antenna sensitivity and output limit of the transmitted signals.

SUMMARY

Accordingly, it is necessary to divide a service area into small sections in a network environment and sequentially provide services while moving each section using mobility.

In such a situation, when the service area is divided into a plurality of sections for scheduling and then a radio communication service is provided, it is essential that the service area is configured with an appropriate number of sections in consideration of the channel error of a drone and the transmission opportunity of a sensor terminal. When the service area is divided into a relatively large number of sections, the size of each section is reduced. Also, the distance between the sensor terminal and the drone in the corresponding area is reduced. Accordingly, the sensor terminal and the drone can perform communication in an improved channel environment. Thus, the drone becomes robust against channel errors.

However, in terms of the transmission opportunity, as the number of sections increases, the traveling time of the drone increases and thus the transmission opportunity of the sensor terminal decreases. Accordingly, in order to improve network performance efficiency when providing wireless communication services in a specific service area using a drone, a scheduling method of dividing a service area into an optimal number of sections is urgently needed. However, there is no scheduling method for dividing a service area into an optimal number of sections, which results in lowered network performance efficiency.

The present invention provides methods and apparatuses for scheduling a service area in a drone network environment, which can provide an efficient communication service to terminals in the service area targeted by a drone in the drone network environment providing wireless communication to terrestrial terminals using the drone.

The present invention also provides methods and apparatuses for scheduling a service area in a drone network environment, which can maximize the throughput of the service area to which a drone provides a wireless communication service, by setting sections by finding an optimal value for determining the number of divided sections when dividing and scheduling a target service area of the drone into a plurality of sections.

The present invention also provides methods and apparatuses for scheduling a service area in a drone network environment, which can efficiently improve the network performance by dividing and scheduling the service area into an optimal number of sections such that the network throughput is maximized and by collecting terminal data from terminals according to the divided and scheduled sections or providing a wireless communication service to terminals. By maximizing the network performance, a drone can operate in an energy-efficient way.

The present invention also provides methods and apparatuses for scheduling a service area in a drone network environment, which can easily determine the number of sections constituting the service area only by searching a minimum of sections without an overall search of each section in order to optimize throughput performance when providing a wireless communication service to a specific service area using a drone.

The present invention can enhance the energy-efficiency of drone networks by collecting maximum data during the flight time.

In an aspect, a service area scheduling method performed by a drone in a drone network environment includes: calculating a throughput in each section while changing a variable determining the number of sections within a maximum value of the variable and determining a variable, by which the calculated throughput becomes maximum, as an optimal value when a service area of the drone is divided into a plurality of sections; dividing the service area into a plurality of sections according to the determined optimal value and scheduling a service providing period of the divided service area; and communicating with a terminal located in the service area according to the scheduled service providing period.

The determining of the optimal value may include calculating or presetting the maximum value of the variable for determining the number of sections in an initial state where the optimal value is not determined for a specific service area.

The determining of the optimal value may include calculating or presetting a maximum value for the number of sections such that the data collection period of the section period has a value larger than a preset period value for communication with the terminal.

The determining of the optimal value may include calculating or presetting the maximum value for the variable using a flight duration of the drone, a speed of the drone, and a size of the service area.

The determining of the optimal value may include calculating a length of data collection period, a length of moving period, and a frame number according to a changed variable while changing the variable from a preset minimum value to the maximum value or changing the variable from the maximum value to the preset minimum value, and calculating the throughput based on terminal data collected during a frame according to the changed variable.

The determining of the optimal value may include calculating the throughput based on the amount of data collected in the data collection period and calculating the throughput using the changed variable, the number of data collected in the data collection period, the size of data transmitted in a time slot, and the flight duration of the drone.

The determining of the optimal value may include updating the optimal value to a current throughput when the current throughput that is newly calculated is larger than a previous throughput that is previously calculated, and determining that the throughput is an inflection point after a maximum throughput and ending a search mode without updating the optimal value to the current throughput when the current throughput is less than or equal to the previous throughput.

The determining of the optimal value may include increasing the variable from a preset minimum value or decrease the variable from the maximum value as the calculated throughput increases, and determining a previous variable prior to a time point, when the calculated throughput decreases, as the optimal value.

The scheduling of the service providing period may include dividing the service providing period of the divided service area into a data collection period and a moving period, and calculating a length of the data collection period and a length of the moving period using the determined optimal value, a speed of the drone, and a size of the section.

The communicating with the terminal may include communicating with the terminal while sequentially moving around a plurality of sections divided from the service area in a grid shape along any one of a creeping line shape, a track line shape, a parallel track shape, an expanding square shape, a sector shape, and a contour shape.

The method may further include transmitting terminal data collected from the terminal to a server via a communication network, or returning to a base and then transmitting the terminal data to the server through a communication network of the base.

In another aspect, a service area scheduling apparatus in a drone network environment includes: a maximum value calculating unit for calculating a maximum value of a variable determining the number of sections when a service area of the drone is divided into a plurality of sections; an optimal value determining unit calculating a throughput in each section while changing the variable within the calculated maximum value and determining a variable, by which the calculated throughput becomes maximum, as an optimal value; a scheduling unit dividing the service area into a plurality of sections according to the determined optimal value and scheduling a service providing period of the divided service area; and a terminal communication unit for communicating with a terminal located in the service area according to the scheduled service providing period.

The maximum value calculating unit may calculate or preset the maximum value of the variable for determining the number of sections in an initial state where the optimal value is not determined for a specific service area.

The maximum value calculating unit may calculate or preset a maximum value for the number of sections such that the data collection period of the section period has a value larger than a preset period value for communication with the terminal.

The maximum value calculating unit may calculate or preset the maximum value for the variable using a flight duration of the drone, a speed of the drone, and a size of the service area.

The optimal value determining unit may calculate a length of data collection period, a length of moving period, and a frame number according to a changed variable while changing the variable from a preset minimum value to the maximum value or changing the variable from the maximum value to the preset minimum value, and may calculate the throughput based on terminal data collected during a frame according to the changed variable.

The optimal value determining unit may calculate the throughput based on the amount of data collected in the data collection period and calculate the throughput using the changed variable, the number of data collected in the data collection period, the size of data transmitted in a time slot, and the flight duration of the drone.

The optimal value determining unit may update the optimal value to a current throughput when the current throughput that is newly calculated is larger than a previous throughput that is previously calculated, and may determine that the throughput is an inflection point after a maximum throughput and end a search mode without updating the optimal value to the current throughput when the current throughput is less than or equal to the previous throughput.

The optimal value determining unit may increase the variable from a preset minimum value or decrease the variable from the maximum value as the calculated throughput increases, and may determine a previous variable prior to a time point, when the calculated throughput decreases, as the optimal value.

The scheduling unit may divide the service providing period of the divided service area into a data collection period and a moving period, and may calculate a length of the data collection period and a length of the moving period using the determined optimal value, a speed of the drone, and a size of the section.

BRIEF DESCRIPTION OF THE DRAWINGS

FIG. 4 is a view illustrating an algorithm of a search mode operation process of a drone for optimizing the number of sections according to an embodiment of the present invention.

FIG. 9 is a view illustrating simulation parameters in a drone network environment according to an embodiment of the present invention.

DETAILED DESCRIPTION OF EXAMPLE EMBODIMENTS OF THE INVENTION

Figure 1:
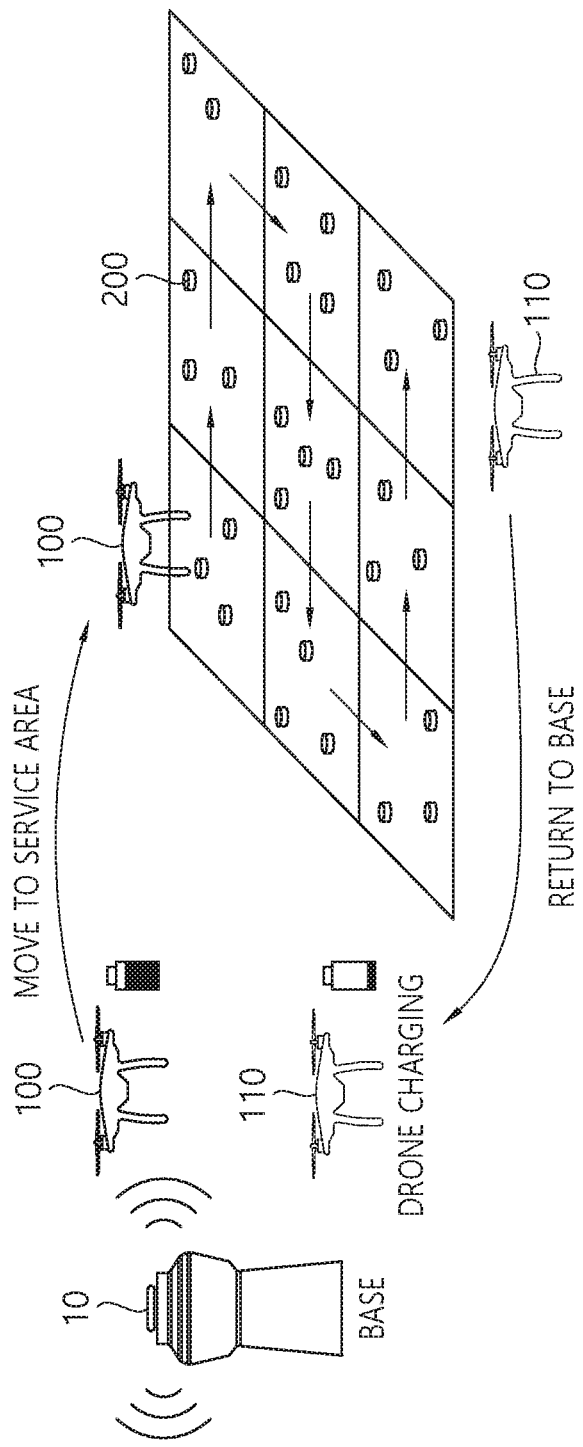
FIG. 1 is a view illustrating a drone network environment according to an embodiment of the present invention.

Since the present invention may be modified into various types and may be implemented into various embodiments, specific embodiments will be illustrated in the drawings and described in this disclosure in detail.

However, the present invention is not limited to a specific implementation type, but should be construed as including all modifications, equivalents, and substitutes involved in the spirit and the technical scope of the present invention.

The terms such as "a first/the first" and "a second/the second" may be used to describe various components, but the components should not be limited by the terms. The terms are used only in order to distinguish one component from another component. For example, a first component may be named a second component without deviating from the scope of the present invention, and similarly, the second component may be named the first component. The term "and/or" includes a combination of a plurality of related items or any one of a plurality of related items.

It should be understood that when an element is referred to as being "connected" or "coupled" to another element, it may be directly connected or coupled to the other element but another element may also be interposed therebetween. On the other hand, when an element is referred to as being "directly connected" or "directly coupled" to another element, it should be understood that there are no other elements in between.

The terms used herein are used only to describe specific embodiments, and are not intended to limit the present invention. The singular forms "a," "an," and "the" include plural referents unless the context clearly dictates otherwise. In this disclosure, the terms "include," "comprise," or "have" specify features, numbers, steps, operations, elements or combinations thereof, but do not exclude existence or addition possibility of one or more other features, numbers, steps, operations, elements or combinations thereof.

Unless described otherwise, all terms used herein including technical or scientific terms may include the same meaning as those generally understood by persons skilled in the art to which the present invention belongs. Terms as defined in dictionaries generally used should be construed as including meanings which accord with the contextual meanings of related technology. Also, unless clearly defined in this disclosure, the terms should not be construed as having ideal or excessively formal meanings.

Hereinafter, exemplary embodiments of the present invention will be described in detail with reference to the accompanying drawings. In order to help the overall understanding of the present disclosure, the same reference numerals will be used for the same elements in the drawings, and a duplicate description of the same elements will be omitted.

FIG. 1 is a view illustrating a drone network environment according to an embodiment of the present invention.

As shown in FIG. 1, a drone network environment according to an embodiment of the present invention includes a base 10 distant from a service area, a drone 100 providing a wireless communication service to a service area, and a terminal 200.

The base 10 generally represents a place where there is a facility for distributing articles necessary for the drone 100 or repairing the drone 100. When mounted batteries are running out while the drone 100 is flying over the service area and, the drone 100 returns to the base 10 to charge the batteries.

The drone 100 may collect terminal data of terminals existing in a target service area by wireless communication, or may provide wireless communication services to the terminals. The drone 100 may transmit the collected terminal data to a server in real-time through a satellite communication or wireless communication network, or may return to the base 10 and transmit the collected data to the server.

Here, the service area is defined as an L×L size. There are N terminals in the service area. The size of the service area and the number of terminals are not limited to specific size and number. For efficient terminal data collection, the drone 100 divides the service area into k×k sections in a grid form, and collects the terminal data while moving to each of sections. The section is not limited to a specific form, and any form may be used as long as the entire service area can be divided into a plurality of sections. It is assumed that the terminals 200 are uniformly distributed in the service area. Accordingly, $Ns=N/k^2$ terminals exist in each section on average. Here, N represents the total number of terminals, k represents a variable for determining a section, and Ns represents the number of terminals existing in the section.

The drone 100 may stay in the air for a time $T_f$ due to the limit of the battery capacity, and during this time, the drone 100 services while sequentially moving to each section in accordance with the shape of a creeping line. Here, the drone 100 is not limited to moving and servicing according to a specific shape. For example, the drone 100 may service while sequentially moving along any one of a track line shape, a parallel track shape that is a search section aligned with main axis of individual search area, an expanding square shape, a sector shape, and a contour shape.

A case where terminal data are collected from terminals in a service area through a plurality of drones will be described. After the $T_f$ time, the previous drone 110 returns to the base 10 due to battery discharge, and charges the battery. While the previous drone 110 is charging the battery, the next drone 100 may move to the corresponding service area to perform terminal data collection. The terminal data may be continuously collected from the terminal 200 in the service area through the next drone 100 even when the battery of the previous drone 110 is being charged. Accordingly, the efficiency of the drone operation with respect to the entire service time can be increased. So, the energy-efficient of drone network will be improved.

For example, in FIG. 1, a plurality of drone 100 and 110 collect terminal data from the terminals 200 in each section while sequentially moving around the service area divided into 3×3 sections.

Figure 2:
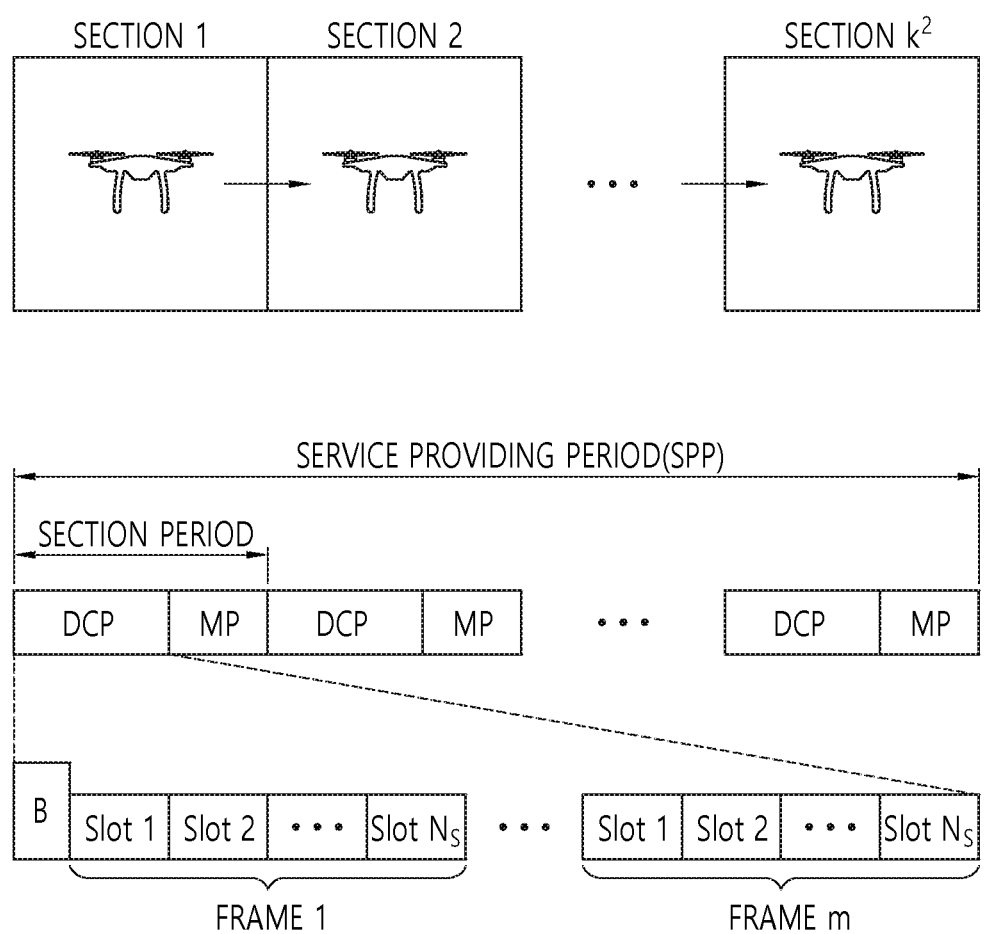
FIG. 2 is a view illustrating a communication framework for a wireless communication service of a drone according to an embodiment of the present invention.

FIG. 2 is a view illustrating a communication framework for a wireless communication service of a drone according to an embodiment of the present invention.

As shown in FIG. 2, when a variable value in which a plurality of sections are determined is k, the service area that the drone 100 desires to service is divided into $k^2$ sections. For example, $k^2$ sections are divided into a section 1, a section 2, . . . , and a section $k^2$.

Then, the drone 100 operates on the basis of the service providing period (SPP) as a basic unit, which represents the total service providing time in accordance with the flight time $T_f$. The total service providing period SPP includes a corresponding number of section periods (SPs) according to the number of sections k×k. The length of the section period SP is calculated by the following Equation 1.

$$T_{SP,k} = \frac{T_f}{k^2} \quad (1)$$

where $T_{SP,k}$ is the length of the section period, $T_f$ is the flight duration, and $k^2$ is the number of sections.

Each section period SP is divided into a data collection period DCP for data transmission and a moving period MP for moving to the next section. The lengths of the data collection period and the moving period are determined by the following Equation 2 and Equation 3 according to the value k for determining the number of sections.

$$T_{DCP,k} = \frac{1}{k^2}\left(T_f - \frac{Lk}{2v_d}\right) \quad (2)$$

$$T_{MP,k} = \frac{L}{2v_d k} \quad (3)$$

where $T_{DCP,k}$ is the length of the data collection period, $T_{MP,k}$ is the length of the moving period, $v_d$ is the speed of the drone, $T_f$ is the flight duration, and L is the size of the service area.

The data collection period DCP includes $m_k$ frames including $N_s$ time slots. The number $m_k$ of frames is calculated by the following Equation 4 as follows.

$$m_k = \left\lfloor \frac{T_{DCP,k}}{N_s T_{slot}} \right\rfloor \quad (4)$$

where $m_k$ is the number of frames, $N_s$ is the number of terminals, and $T_{slot}$ is the length of the time slot.

Hereinafter, communication between the drone 100 and the terminal 200 in the data collection period (DCP) will be described. First, the drone 100 transmits a beacon message to the terminal 200 at the start time of the data collection period to start communication. The drone 100 transmits the beacon message by including frame information on the number $m_k$ of frames and frame size in the data collection period in the beacon message. At this time, the drone 100 may transmit the beacon message by adjusting power in consideration of the size of the section such that the terminals in the section can receive the beacon message. For example, the drone 100 may transmit the beacon message by increasing power as the size of the section increases. On the contrary, the drone 100 may transmit the beacon message by reducing power as the size of the section decreases.

When receiving the beacon message transmitted from the drone 100, the terminal 200 recognizes that the drone 100 exist in the corresponding sections and starts data transmission. The terminal 200 selects one arbitrary time slot from each frame to attempt data transmission.

Thereafter, the drone 100 receives a signal in the selected time slot. Then, when the Signal-to-Interference-plus-Noise Ratio (SINR) of the corresponding signal is greater than a certain value, the drone 100 may recover and receive the terminal data. Otherwise, the drone 100 fails to receive the terminal data. This process is performed during $m_k$ frames of the data collection period. When the data collection period is finished, the drone 100 moves to the next section during the moving period (MP). Thereafter, the drone 100 may transmit the beacon message in the next data collection period, and may collect the terminal data from another terminal that has received the beacon message.

Figure 3:
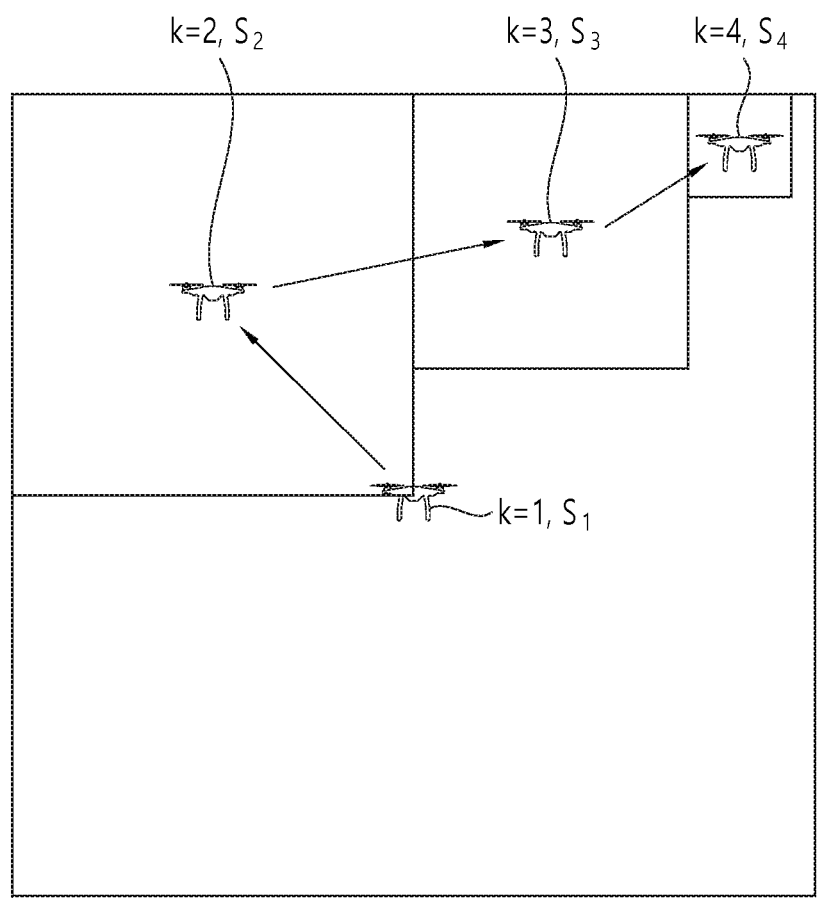
FIG. 3 is a view illustrating a search mode performed by a drone for a service providing period according to an embodiment of the present invention.

FIG. 3 is a view illustrating a search mode performed by a drone for a service providing period according to an embodiment of the present invention.

As an example of a search mode performed by the drone 100, FIG. 3 shows a process in which the drone 100 records the throughputs corresponding to each k value while varying the k value from 1 to 4. For example, the drone 100 may record the throughput while moving to the corresponding section as the k value is changed. For example, when the k value is 1, the drone 100 moves to the center of the service area and records the throughput ($S_1$). When the k value is 2, the drone 100 moves to one of the four sections into which the service area is divided and records the throughput ($S_2$). At this time, the drone 100 may move in a predetermined direction among a plurality of sections, in a direction closest to the current position, or in a direction determined according to the current movement situation, and the movement direction is not limited to a specific movement direction. As another example, the drone 100 may record the throughput corresponding to each k value while changing the k value from 1 to 4. As another example, the drone 100 may select any k value from the range of the entire k value, or may select the k value selected based on the previously determined k value as a reference and record the throughput while moving to the corresponding section according to a variation of the selected k value.

The drone 100 according to an embodiment of the present invention performs scheduling for determining the number of sections for optimizing the service area using the throughput recorded as above. When the number of sections increases, the reception rate of the terminal data of the drone 100 increases due to the reduction of the section size. However, the length of the data collection period in which actual data transmission is performed is reduced due to an increase of the movement time between the sections. Accordingly, the drone 100 according to an embodiment of the present invention performs a service area scheduling process of finding an optimal value for determining the optimal number of sections. This scheduling process is performed in the search mode. Hereinafter, the search mode will be described.

First, for scheduling of a service area, the drone 100 performs the search mode in an initial state. At this time, the initial state indicates a state in which the optimal number of sections is not determined for a specific service area. While starting the search mode, the drone 100 calculates the maximum value $k_{max}$ of the k value that determines the number of sections. In order for the drone 100 to communicate with the terminal 200, the length of the data collection period needs to be greater than zero. The maximum value $k_{max}$ of the k values satisfying this condition may be calculated by the following Equation 5.

$$k_{max} = \min\left(\left\lfloor\frac{2T_f v_d}{L}\right\rfloor - 1, 1\right) \quad (5)$$

where $k_{max}$ is the maximum value of k, $v_d$ is the speed of a drone, $T_f$ is the flight duration of a drone, and L is the size of the service area.

Then, the drone 100 schedules the data collection period corresponding to each k value while increasing the value k from 1 to $k_{max}$ during the service providing period SPP, and records the throughput based on the amount of data collected in the data collection period. The throughput corresponding to a specific k value may be calculated by the following Equation 6.

$$S_k = \frac{k^2 n_s D}{T_f} \quad (6)$$

where $S_k$ is the throughput, $k^2$ is the number of sections, $n_s$ is the number of data collected in the data collection period, and D is the size of data transmitted in the time slot.

The drone 100 records the throughput according to the value of k. When a newly recorded throughput value is larger than a previous throughput value, the drone 100 updates the variable k* value that determines the optimal number of sections as the current k value like k*=k.

Thereafter, the drone 100 repeats the corresponding process for the next k. If the current throughput value is less than or equal to the just previous throughput value, then the drone 100 determines that the current throughput passes an inflection point after the maximum value, and terminates the search mode without updating the k value that determines the optimal number of sections. That is, the drone 100 determines that the previous throughput value is the maximum throughput corresponding to the inflection point.

FIG. 4 is an algorithm illustrating a search mode operation process of a drone for optimizing the number of sections according to an embodiment of the present invention.

As shown in FIG. 4, first, the drone 100 calculates the maximum value $k_{max}$ through Equation 5 above.

Then, the drone 100 initializes the previous throughput to zero (S*=0).

Next, while changing k=1 to $k_{max}$, the drone 100 calculates the length $T_{DCP,k}$ of the data collection period using Equation 2 above, and calculates the number $m_k$ of frames using Equation 4.

Then, the drone 100 calculates the throughput $S_k$ through the amount of collected data and Equation 6 above.

Thereafter, when the current throughput is larger than the previous throughput like $S_k > S^*$, the drone 100 updates the variable value k* for determining the optimal number k* of sections to the current k value like k*=k.

On the other hand, when the current throughput is less than or equal to the previous throughput, the drone 100 determines that the previous throughput is the k value that determines the optimal number of sections and ends the search mode without updating the k value.

Figure 5:
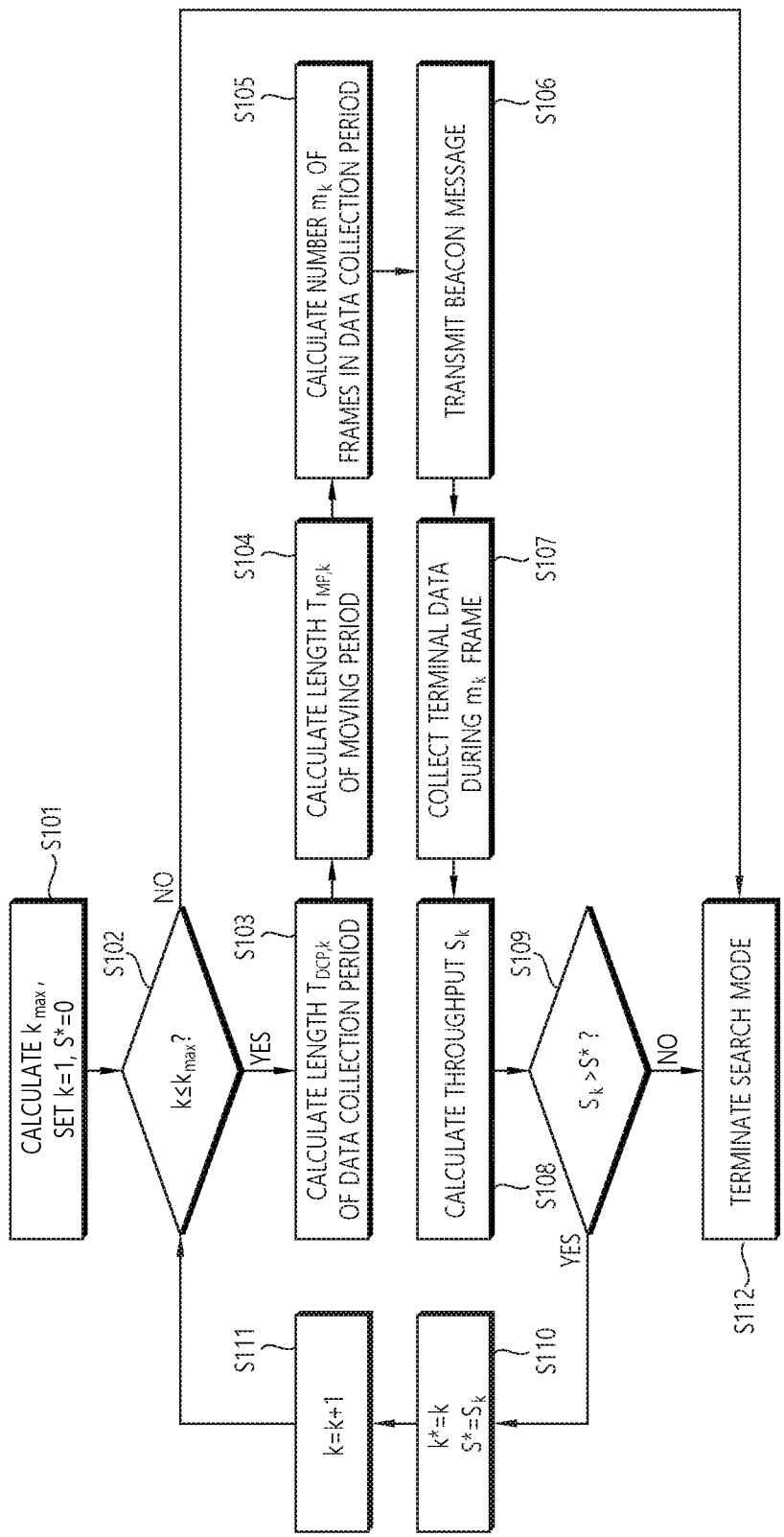
FIG. 5 is a view illustrating a flowchart of a search mode in a service area scheduling method according to an embodiment of the present invention.

FIG. 5 is a view illustrating a flowchart of a search mode in a service area scheduling method according to an embodiment of the present invention.

As shown in FIG. 5, in operation S101, the drone 100 calculates a maximum value $k_{max}$ of a variable k determining the number of sections, and sets k=1 and S*=0.

In operation S102, the drone 100 determines whether the variable k is less than or equal to the maximum value $k_{max}$.

In operation S103, when the variable k is less than or equal to the maximum value $k_{max}$, the drone 100 calculates the length $T_{DCP,k}$ of the data collection period.

In operation S104, the drone 100 calculates the length $T_{MP,k}$ of the moving period.

In operation S105, the drone 100 calculates the number $m_k$ of frames within the data collection period.

In operation S106, the drone 100 transmits a beacon message to the terminal 200.

In operation S107, the drone 100 collects terminal data from the terminal 200 during the frame $m_k$.

In operation S108, the drone 100 calculates the throughput $S_k$.

In operation S109, the drone 100 determines whether the current throughput exceeds the previous throughput ($S_k > S^*$).

In operation S110, when the current throughput exceeds the previous throughput, the drone 100 update the variable k* determining the optimal number of sections to the current k value and update the previous throughput to the current throughput (k*=k, S*=S).

In operation S111, the drone 100 increments the value of the variable k by 1 (k=k+1), and resumes from operation S102.

Thereafter, in operation S102, when the variable k exceeds the maximum value $k_{max}$, the drone 100 ends the search mode after determining the previous k value to a variable k* determining the optimal number of sections.

Hereinafter, a search mode in the service area scheduling method according to another embodiment of the present invention will be described.

In the service area scheduling method according to another embodiment of the present invention, when the service area of the drone 100 is divided into a plurality of sections, the drone 100 may preset the maximum value $k_{max}'$ of the variable k. For example, the drone 100 may preset a maximum value for a variable by using the flight duration of the drone 100, the speed of the drone 100, and the size of the service area. Considering an embodiment and another embodiment of the present invention, when the service area of the drone 100 is divided into a plurality of sections, the drone 100 may calculate the maximum value $k_{max}$ of the variable k determining the number of sections, or may preset the maximum value $k_{max}'$ of the variable k.

Unlike an embodiment of the present invention shown in FIG. 5, the maximum value $k_{max}$ of the variable k determining the number of sections may not be calculated, and the maximum value $k_{max}'$ of the variable k may be preset. That is, the service area scheduling method according to another embodiment of the present invention may schedule the service area using a predetermined maximum value $k_{max}'$ without a process of calculating the maximum value $k_{max}$ of the variable k determining the number of sections.

Then, the drone 100 may calculate the throughput in each section while changing the variable k within a preset maximum value $k_{max}'$, and may determine a variable in which the calculated throughput becomes maximum as the optimal value.

Then, the drone 100 determines whether the variable k is less than or equal to the maximum value $k_{max}'$. When the variable k is less than or equal to the maximum value $k_{max}'$, the drone 100 calculates the length $T_{DCP,k}$ of the data collection period, the length $T_{MP,k}$ of the moving period, and the number $m_k$ of frames in the data collection period.

Thus, in the service area scheduling method according to another embodiment of the present invention, the calculated maximum value $k_{max}$ calculated according to an embodiment of the present invention may be changed into a preset maximum value $k_{max}'$, and then subsequent operations may be performed.

Specifically, for communication with the terminal 200, the drone 100 may preset a maximum value for the number of sections such that the data collection period of the section period has a value larger than a predetermined period value.

When the maximum value is preset, the drone 100 may calculate the length of data collection period, the length of moving period, and the number of frames while changing the variable from a predetermined minimum value to a preset maximum value or from a preset maximum value to a predetermined minimum value, and may calculate the throughput based on the terminal data collected during the frame according to the changed variable.

Furthermore, the drone 100 may increase the variable from a predetermined minimum value or decrease from a preset maximum value $k_{max}'$ as the calculated throughput increases, and may determine a previous variable prior to a time point, when the calculated throughput decreases, as the optimal value.

Figure 6:
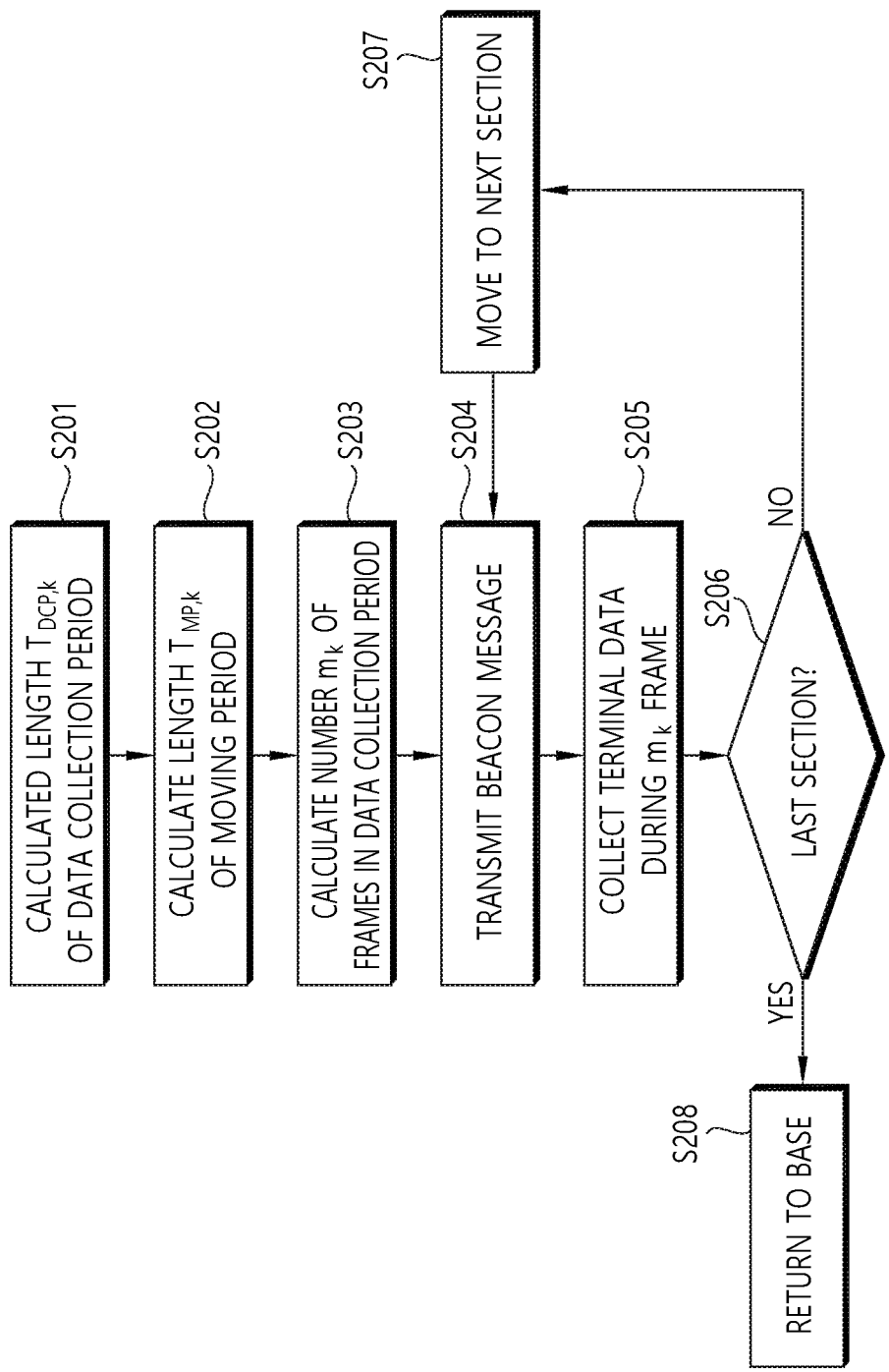
FIG. 6 is a view illustrating a flowchart of a service providing mode in the service area scheduling method according to an embodiment of the present invention.

FIG. 6 is a view illustrating a flowchart of a service providing mode in the service area scheduling method according to an embodiment of the present invention.

In the service providing mode, the drone 100 uses the variable k value for determining the optimal number of sections determined in the search mode of FIG. 5 in the service providing mode.

As shown in FIG. 6, in operation S201, the drone 100 calculates the length $T_{DCP,k}$ of a data collection period.

In operation S202, the drone 100 calculates the length $T_{MP,k}$ of the moving period.

In operation S203, the drone 100 calculates the number $m_k$ of frames in the data collection period.

In operation S204, the drone 100 transmits a beacon message to the terminal 200.

In operation S205, the drone 100 collects terminal data from the terminal 200 during the frame $m_k$.

In operation S206, the drone 100 determines whether or not the current section to service is the last section.

In operation S207, when the current section is not the last section, the drone 100 moves to the next section, and again performs operation S204 to transmit a beacon message.

In operation S207, when the current section is the last section, the drone 100 ends the service providing mode and returns to the base. Even when the current section is not the last section but the battery necessary for return to the base 10 is discharged, the drone 100 may return to the base 10.

Figure 7:
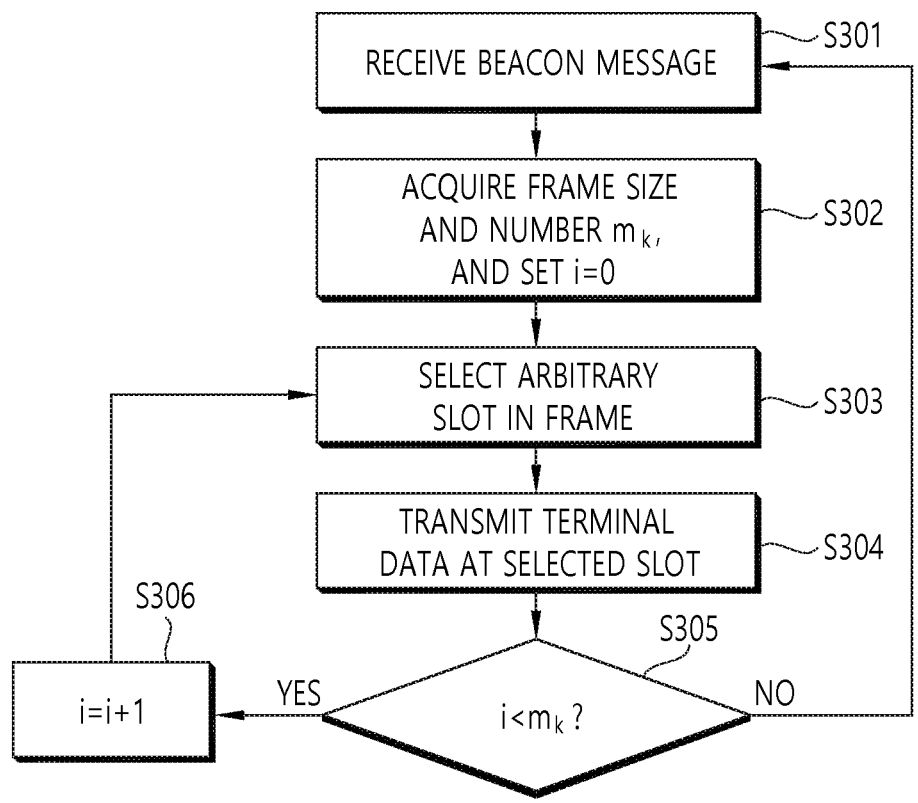
FIG. 7 is a view illustrating an operation performed by a terminal in a service area scheduling method according to an embodiment of the present invention.

FIG. 7 is a view illustrating an operation performed by a terminal in a service area scheduling method according to an embodiment of the present invention.

As shown in FIG. 7, in operation S301, the terminal 200 receives a beacon message from the drone 100.

In operation S302, the terminal 200 acquires frame information such as the size of frame and the number $m_k$ of frames from the received beacon message. In addition, the terminal 200 sets an i value indicating the number of communications to 0. This setting indicates that i indicating the number of communications is initialized to 0.

In operation S303, the terminal 200 arbitrarily selects a slot in the frame.

In operation S304, the terminal 200 transmits the terminal data to the drone 100 in a slot selected from the frame.

If i is smaller than the number $m_k$ of frames in operation S305, the terminal 200 increments i by 1 like i=i+1, and then performs operation S303 again to select an arbitrary slot in the frame. When i is larger than or equal to the number $m_k$ of frames, the terminal 200 repeats the procedure from operation S301 in which the beacon message is received from the drone 100.

Figure 8:
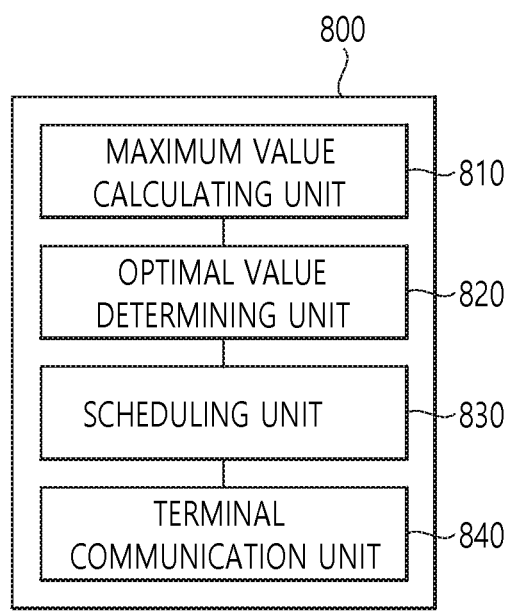
FIG. 8 is a view illustrating a configuration of a service area scheduling apparatus in a drone network environment according to an embodiment of the present invention.

FIG. 8 is a view illustrating a configuration of a service area scheduling apparatus in a drone network environment according to an embodiment of the present invention.

As shown in FIG. 8, a service area scheduling apparatus 800 in a drone network environment according to an embodiment of the present invention includes a maximum value calculating unit 810, an optimal value determining unit 820, a scheduling unit 830, and a terminal communication unit 840. Here, the service area scheduling apparatus 800 may be implemented in the drone 100 to perform a service area scheduling method. Alternatively, the service area scheduling apparatus 800 may be implemented in a server connected to the drone 100 through a communication network to perform a service area scheduling method.

Hereinafter, concrete configurations and operations of each component of the service area scheduling apparatus 800 of FIG. 8 will be described.

The maximum value calculating unit 810 calculates a maximum value of a variable for determining the number of sections when the service area of the drone 100 is divided into a plurality of sections. The maximum value calculating unit 810 may determine the number of sections in an initial state in which the optimal value is not determined for a specific service area. For communication with the terminal 200, the maximum value calculating unit 810 may calculate a maximum value for the number of sections such that the data collection period of the section period has a value larger than a preset period value. The maximum value calculating unit 810 may calculate a maximum value for the variable k using the flight duration of the drone 100, the speed of the drone 100, and the size of the service area.

The optimal value determining unit 820 calculates throughputs in each section while changing the variable for determining the number of sections within the maximum value calculated by the maximum value calculating unit 810, and determines a variable in which the calculated throughput becomes maximum as an optimal value. The optimal value determining unit 820 may calculate the length of data collection period, the length of moving period, and the number of frames according to the changed variable while changing the variable from a predetermined minimum value to a maximum value or from the maximum value to a predetermined minimum value, and the throughput based on the terminal data collected during the frame according to the changed variable. The optimal value determining unit 820 may calculate the throughput based on the amount of data collected in the set data collection period, and may calculate the throughput using the changed variable, the number of data collected in the data collection period, the size of data transmitted in a time slot, and the flight duration of the drone. When the current throughput that is newly calculated is larger than the previous throughput that is previously calculated, the optimal value determining unit 820 may update the optimal value to the current throughput, and when the current throughput is less than or equal to the previous throughput, the optimal value determining unit 820 may determine that the throughput is an inflection point after the maximum throughput and end the search mode without updating the optimal value to the current throughput. As the calculated throughput increases, the optimal value determining unit 820 may increase the variable from the preset minimum value or decrease the variable from the maximum value, and may determine a previous variable prior to a time point, when the calculated throughput decreases, as the optimal value.

The scheduling unit 830 divides the service area into a plurality of sections according to the optimal value determined by the optimal value determining unit 820, and schedules the service providing period of the divided service area. The scheduling unit 830 may divide the service providing period of the divided service area into a data collection period and a moving period, and may calculate the length of data collection period and the length of moving period using the determined optimal value, the speed of the drone, and the size of the section.

The terminal communication unit 840 collects terminal data from the terminal 200 located in the service area according to the scheduled service providing period. The terminal communication unit 840 collects terminal data by sequentially moving to each section, which is divided from the service area in a grid shape, in a form of a creeping line. The terminal communication unit 840 may transmit the collected data to the server through a communication network, or may return to the base 10 and then transmit the collected data to the server through a communication network of the base 10.

FIG. 9 is a view illustrating simulation parameters in a drone network environment according to an embodiment of the present invention.

FIG. 9 shows simulation parameters used for evaluating the performance when the drone 100 performs wireless communication in a drone network environment. The simulation parameters include the size of the service area ($L^2$), the number of sections ($k^2$), the speed of the drones ($v_d$), the duration of flight ($T_f$), the number of terminals distributed in the service area (N), and the data size (800 bits).

According to an example of the simulation parameters shown in FIG. 9, in the drone network environment, the performance is evaluated by arranging 100,000 terminals in the service areas of 10 km$^2$ and 15 km$^2$. The drone 100 stays in the air for 7,200 seconds and collects data of the terminal 200. The performance evaluation is conducted with three scenarios, i.e., Scenario 1 (L=15 km, $v_d$=200 km/h), Scenario 2 (L=10 km, $v_d$=200 km/h), Scenario 3 (L=10 km, $v_d$=100 km/h) in consideration of the size of the service area and the speed of the drone 100.

Figure 10:
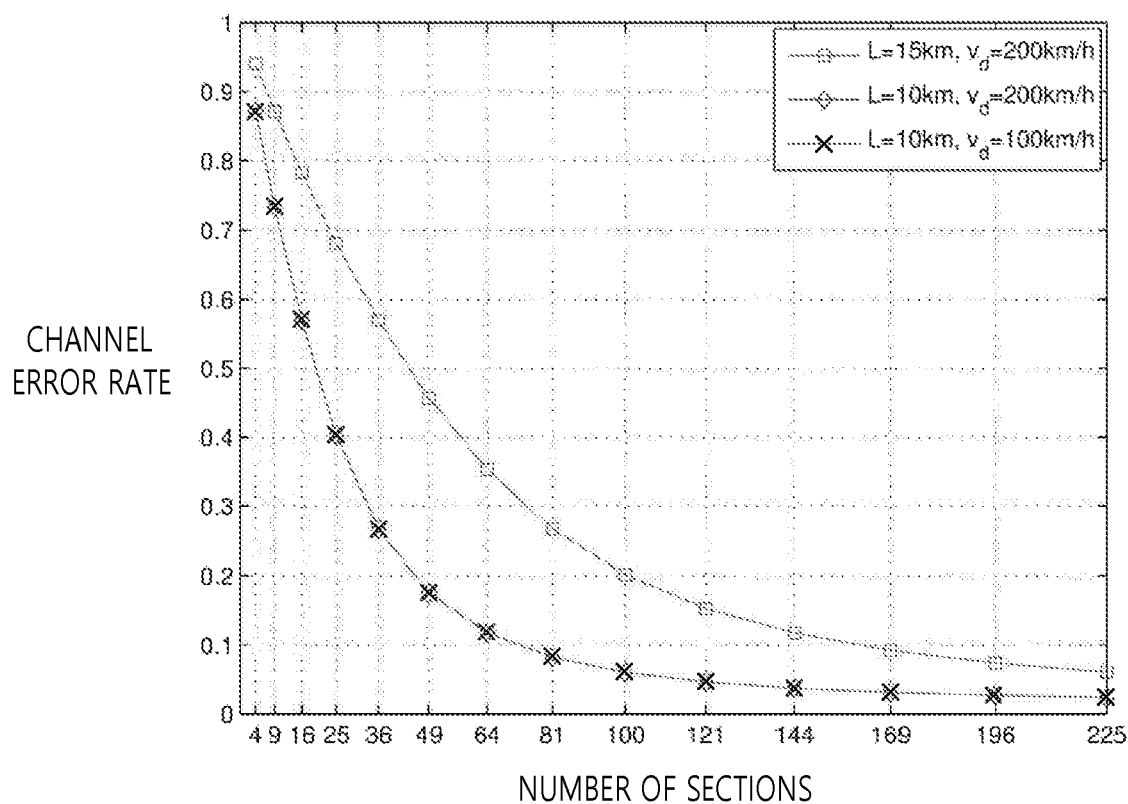
FIG. 10 is a view illustrating a channel error rate with respect to the number of sections in a drone network environment according to an embodiment of the present invention.

FIG. 10 is a view illustrating a channel error rate with respect to the number of sections in a drone network environment according to an embodiment of the present invention.

As shown in FIG. 10, the channel error rate indicates a ratio at which the terminal data transmitted from the terminal 200 is not received by the drone 100 due to interference and noise. As the number of sections (e.g., $k^2$=4, 9, 16, . . . , 225, etc.) increases, the channel error rate tends to decrease from a maximum of 1 to a value close to zero. This is because as the number of sections increases, the size of the section decreases in the same service area, and thus the communication distance between the drone 100 and the terminals 200 becomes shorter. Also, in all cases of Scenario 1 (L=15 km, $v_d$=200 km/h), Scenario 2 (L=10 km, $v_d$=200 km/h), and Scenario 3 (L=10 km, $v_d$=100 km/h), as the service area size L decreases, it is confirmed that the channel error rate decreases for the same reason. Since the channel error rates of Scenario 2 and Scenario 3 are the same, it can be seen that the speed vd of the drone 100 is not related to the channel error rate.

Figure 11:
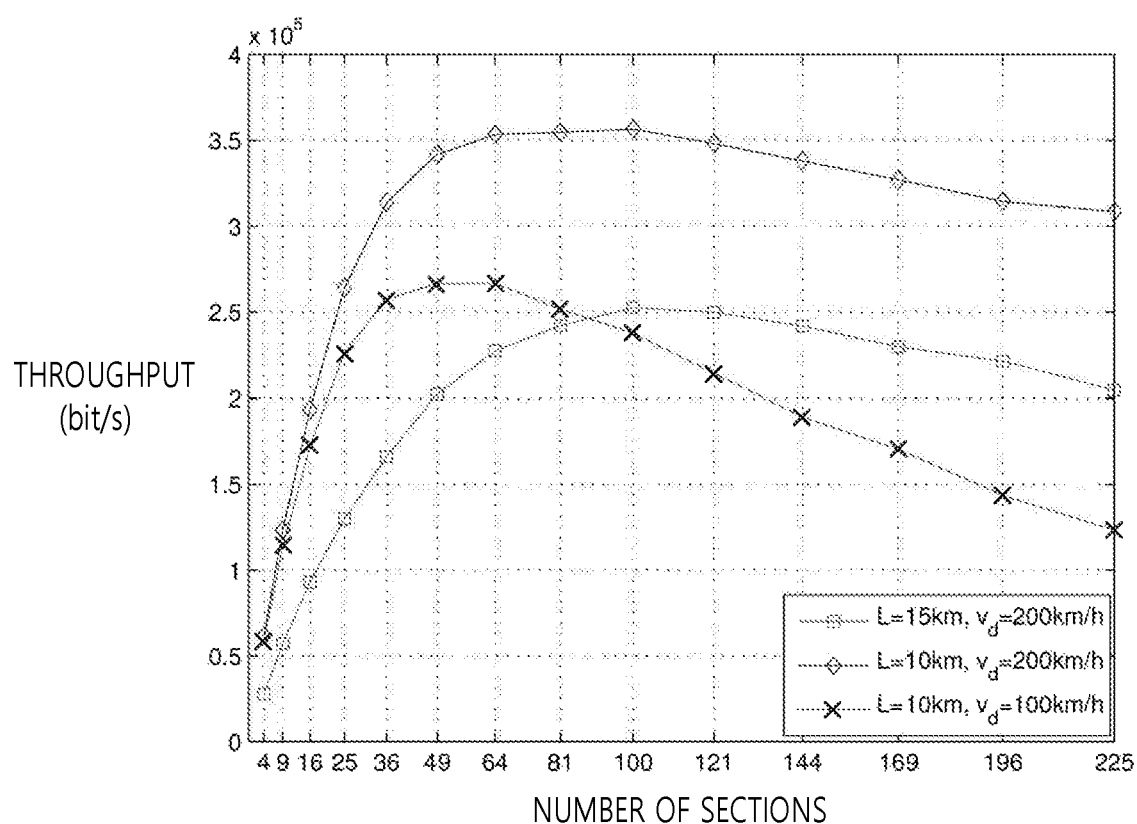
FIG. 11 is a view illustrating a network throughput with respect to the number of sections in a drone network environment according to an embodiment of the present invention.

FIG. 11 is a view illustrating a network throughput with respect to the number of sections in a drone network environment according to an embodiment of the present invention.

As shown in FIG. 11, it is confirmed that an optimal number $k^2$ of sections having a maximum throughput (bit/s) exists. In the case of Scenario 1 (L=15 km, $v_d$=200 km/h) and Scenario 2 (L=10 km, $v_d$=200 km/h), the optimal number $k^2$ of sections is 100. Also, the throughput of Scenario 2 is more improved than that of Scenario 1. This is because the channel error rate is relatively reduced due to the reduction of the service area size. In Scenario 3 (L=10 km, $v_d$=100 km/h), the optimal number of sections is 49. In scenario 3, the drone has the lowest speed and thus has the shortest length of data collection period. For this reason, the optimal number of sections becomes relatively smaller. For all cases, the present invention obtain the optimal number of sections and the maximum throughput. As a result, the present invention can improve the energy efficiency of drone networks.

Although the present invention has been described with reference to the drawings and embodiments, it can be understood that the scope of protection of the present invention is not limited by the drawings and embodiments, and it will be understood by those skilled in the art that various modifications and changes can be made without departing from the spirit and scope of the present invention described in the appended claims.

What is claimed is:

1. A service area scheduling method performed by a drone in a drone network environment, the method comprising:
    calculating a throughput in each section while changing a variable determining the number of sections within a maximum value of the variable, when a service area of the drone is divided into a plurality of sections, and determining a variable, by which the calculated throughput becomes maximum, as an optimal value;
    dividing the service area into a plurality of sections according to the determined optimal value and scheduling a service providing period of the divided service area; and
    communicating with a terminal located in the service area according to the scheduled service providing period.

2. The method of claim 1, wherein the determining of the optimal value comprises calculating or presetting the maximum value of the variable for determining the number of sections in an initial state where the optimal value is not determined for a specific service area.

3. The method of claim 1, wherein the determining of the optimal value comprises calculating or presetting a maximum value for the number of sections such that the data collection period of the section period has a value larger than a preset period value for communication with the terminal.

4. The method of claim 1, wherein the determining of the optimal value comprises calculating or presetting the maximum value for the variable using a flight duration of the drone, a speed of the drone, and a size of the service area.

5. The method of claim 1, wherein the determining of the optimal value comprises calculating a length of data collection period, a length of moving period, and a frame number according to a changed variable while changing the variable from a preset minimum value to the maximum value or changing the variable from the maximum value to the preset minimum value, and calculating the throughput based on terminal data collected during a frame according to the changed variable.

6. The method of claim 1, wherein the determining of the optimal value comprises calculating the throughput based on the amount of data collected in the data collection period and calculating the throughput using the changed variable, the number of data collected in the data collection period, the size of data transmitted in a time slot, and the flight duration of the drone.

7. The method of claim 1, wherein the determining of the optimal value comprises updating the optimal value to a current throughput when the current throughput that is newly calculated is larger than a previous throughput that is previously calculated, and determining that the throughput is an inflection point after a maximum throughput and ending a search mode without updating the optimal value to the current throughput when the current throughput is less than or equal to the previous throughput.

8. The method of claim 1, wherein the determining of the optimal value comprises increasing the variable from a preset minimum value or decreasing the variable from the maximum value as the calculated throughput increases, and determining a previous variable prior to a time point, when the calculated throughput decreases, as the optimal value.

9. The method of claim 1, wherein the scheduling of the service providing period comprises dividing the service providing period of the divided service area into a data collection period and a moving period, and calculating a length of the data collection period and a length of the moving period using the determined optimal value, a speed of the drone, and a size of the section.

10. The method of claim 1, wherein the communicating with the terminal comprises communicating with the terminal while sequentially moving around a plurality of sections divided from the service area in a grid shape along any one of a creeping line shape, a track line shape, a parallel track shape, an expanding square shape, a sector shape, and a contour shape.

11. The method of claim 1, further comprising transmitting terminal data collected from the terminal to a server via a communication network, or returning to a base and then transmitting the terminal data to the server through a communication network of the base.

12. A service area scheduling apparatus in a drone network environment, comprising:
a maximum value calculating unit for calculating a maximum value of a variable determining the number of sections when a service area of the drone is divided into a plurality of sections;
an optimal value determining unit calculating a throughput in each section while changing the variable within the calculated maximum value and determining a variable, by which the calculated throughput becomes maximum, as an optimal value;
a scheduling unit dividing the service area into a plurality of sections according to the determined optimal value and scheduling a service providing period of the divided service area; and
a terminal communication unit for communicating with a terminal located in the service area according to the scheduled service providing period.

13. The apparatus of claim 12, wherein the maximum value calculating unit calculates or presets the maximum value of the variable for determining the number of sections in an initial state where the optimal value is not determined for a specific service area.

14. The apparatus of claim 12, wherein the maximum value calculating unit calculates or presets a maximum value for the number of sections such that the data collection period of the section period has a value larger than a preset period value for communication with the terminal.

15. The apparatus of claim 12, wherein the maximum value calculating unit calculates or presets the maximum value for the variable using a flight duration of the drone, a speed of the drone, and a size of the service area.

16. The apparatus of claim 12, wherein the optimal value determining unit calculates a length of data collection period, a length of moving period, and a frame number according to a changed variable while changing the variable from a preset minimum value to the maximum value or changing the variable from the maximum value to the preset minimum value, and calculates the throughput based on terminal data collected during a frame according to the changed variable.

17. The apparatus of claim 12, wherein the optimal value determining unit calculates the throughput based on the amount of data collected in the data collection period and calculates the throughput using the changed variable, the number of data collected in the data collection period, the size of data transmitted in a time slot, and the flight duration of the drone.

18. The apparatus of claim 12, wherein the optimal value determining unit updates the optimal value to a current throughput when the current throughput that is newly calculated is larger than a previous throughput that is previously calculated, and determines that the throughput is an inflection point after a maximum throughput and ends a search mode without updating the optimal value to the current throughput when the current throughput is less than or equal to the previous throughput.

19. The apparatus of claim 12, wherein the optimal value determining unit increases the variable from a preset minimum value or decreases the variable from the maximum value as the calculated throughput increases, and determines a previous variable prior to a time point, when the calculated throughput decreases, as the optimal value.

20. The apparatus of claim 12, wherein the scheduling unit divides the service providing period of the divided service area into a data collection period and a moving period, and calculates a length of the data collection period and a length of the moving period using the determined optimal value, a speed of the drone, and a size of the section.

* * * * *